T. A. EDISON.
Receiving Instruments for Chemical Telegraphs.
No. 150,847.   Case 72.   Patented May 12, 1874.
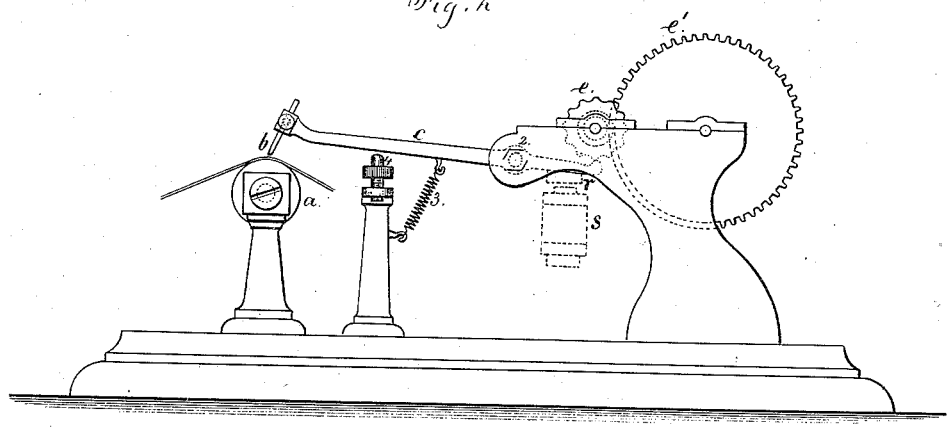
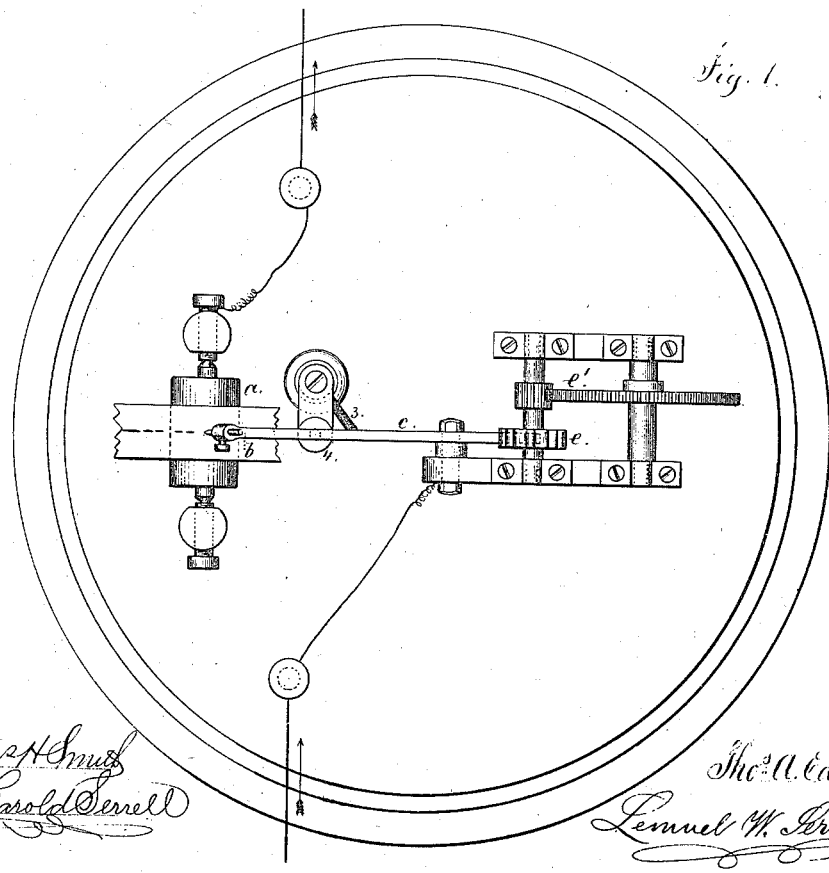

UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN RECEIVING-INSTRUMENTS FOR CHEMICAL TELEGRAPHS.

Specification forming part of Letters Patent No. 150,847, dated May 12, 1874; application filed July 29, 1873.

CASE 72.

*To all whom it may concern:*

Be it known that I, THOMAS A. EDISON, of Newark, in the county of Essex and State of New Jersey, have invented an Improvement in Receiving-Instruments for Automatic Telegraphing, of which the following is a specification:

In automatic telegraphing, where perforated paper is employed for transmitting, and the message is received upon chemical paper, the marks made upon said chemical paper are often more or less blurred or tailed together when the speed of transmission is very rapid; and this is caused by the static charge or surplus electricity on the line acting upon the paper after the circuit is broken by the transmitter.

My present invention is made to lessen this blurring or tailing of the marks upon the chemical paper; and I accomplish this result by employing a stylus which is vibrated with great rapidity to make and break contact with the paper as the same is drawn along beneath such stylus.

This vibrating stylus offers no impediment to the electric wave or pulsation when the circuit is closed by the tranmitter; hence the mark is made upon the paper; but when the circuit is broken the surplus electricity on the line is not sufficiently powerful to produce any tailing to the mark, because the vibrating stylus is not long enough in contact with the paper for this weak portion of the current to decompose the chemical substances in the paper.

In the drawing, Figure 1 is a plan, and Fig. 2 is a side view, of a device which may be used for vibrating the stylus.

$a$ represents the drum or roller of a receiving-instrument, and over this drum the strip of chemical paper is drawn, as usual. The stylus $b$ is upon a lever, $c$, and this lever moves upon the fulcrum 2, and is vibrated very rapidly by the notched or toothed wheel $e$ acting upon a projection or tooth upon said lever. The spring 3 aids in giving the downward movement to the lever and stylus, and insures the stylus touching the paper. An adjustable stop, 4, limits this downward movement of the lever and stylus. The wheel $e$ may receive its rapid movement from gearing $e'$, operated by a weight, spring, or electro-motor, or the lever may be provided with an armature, $r$, and vibrated by an electro-magnet, $s$, (shown by dotted lines,) the circuit to which is opened and closed by the movement of the lever $c$.

When the circuit is closed at the transmitter by the stylus or roller entering a perforation in the paper, the electric pulsation or wave passes over the line to the stylus $b$ and makes a mark upon the chemical paper, and the vibration of said stylus causes no material difference in the appearance of the mark made, because the current is strong so long as the circuit is closed, and it acts through said stylus the same as though it were resting on the paper all the time. When the circuit is broken at the transmitter, the surplus current which remains on the line prevents this portion of the current passing to the chemical paper; hence the tailing is not made to the mark.

I claim—

A stylus for a chemical receiving-instrument, in combination with mechanism for communicating to such stylus a rapid vibration toward and from the paper, for the purposes set forth.

Signed by me this 24th day of March, A. D. 1873.

THOMAS A. EDISON.

Witnesses:
GEO. T. PINCKNEY,
CHAS H. SMITH.